United States Patent [19]
Nanri

[11] Patent Number: 6,024,904
[45] Date of Patent: *Feb. 15, 2000

[54] METHOD OF MAKING AN ANTIFOGGING WINDOW PLATE OF SYNTHETIC RESINS

[75] Inventor: Hiroyoshi Nanri, Kanumashi, Japan

[73] Assignee: Tsutsunaka Plastic Industry Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/854,527

[22] Filed: May 12, 1997

Related U.S. Application Data

[63] Continuation of application No. 08/525,103, Sep. 8, 1995, abandoned.

[30] Foreign Application Priority Data

Sep. 30, 1994 [JP] Japan .................................. 6-237187

[51] Int. Cl.[7] ............................. B29C 35/02; B29C 45/14
[52] U.S. Cl. ......................... 264/104; 264/251; 264/254; 264/259; 264/263
[58] Field of Search .................................... 219/202, 203, 219/522, 539, 541, 542, 543, 544; 52/171.2; 428/34.38, 46, 461, 500, 532; 264/104, 105, 129, 135, 251, 254, 263, 265, 266, 259, 267

[56] References Cited

U.S. PATENT DOCUMENTS

| | | | |
|---|---|---|---|
| 3,288,983 | 11/1966 | Lear, Sr. .................................. | 219/522 |
| 3,356,833 | 12/1967 | Orcutt ..................................... | 219/522 |
| 3,898,427 | 8/1975 | Levin et al. ............................. | 219/522 |
| 4,046,933 | 9/1977 | Stefanik ............................... | 219/203 X |
| 4,067,945 | 1/1978 | DuRocher ............................... | 264/104 |
| 4,078,107 | 3/1978 | Bitterice et al. ........................ | 219/203 |
| 4,102,722 | 7/1978 | Shoop ..................................... | 156/99 |
| 4,361,751 | 11/1982 | Criss et al. ............................. | 219/522 |
| 4,396,826 | 8/1983 | Orcutt et al. ........................... | 219/522 |
| 4,496,475 | 1/1985 | Abrams .................................. | 252/514 |
| 4,571,322 | 2/1986 | Eichelberger et al. ................. | 264/154 |
| 4,883,947 | 11/1989 | Murase et al. ......................... | 219/541 |
| 4,920,254 | 4/1990 | DeCamp et al. ........................ | 219/544 |
| 4,931,627 | 6/1990 | Watts ..................................... | 219/548 |
| 4,980,016 | 12/1990 | Tada et al. ......................... | 264/272.17 |
| 5,233,166 | 8/1993 | Maeda et al. .......................... | 219/552 |
| 5,264,681 | 11/1993 | Nozaki et al. .......................... | 219/544 |
| 5,296,413 | 3/1994 | Carroll et al. .......................... | 501/19 |
| 5,302,557 | 4/1994 | Carroll et al. .......................... | 501/19 |
| 5,448,037 | 9/1995 | Takase et al. .......................... | 219/203 |
| 5,493,102 | 2/1996 | Takase et al. .......................... | 219/203 |
| 5,616,173 | 4/1997 | Okamoto et al. ....................... | 106/117 |

*Primary Examiner*—Angela Ortiz
*Attorney, Agent, or Firm*—Armstrong, Westerman, Hattori, McLeland & Naughton

[57] ABSTRACT

An antifogging window plate has a transparent film and a base both made of thermoplastic resins. Conductive lines and electrodes are printed using a conductive paste on one side of the film, which is then bonded to the base. One portion of each electrode is exposed as a terminal portion to be connected to an electric contact member. The window plate is made by injection molding with the surface of the film opposite from the printed surface being in contact with the cavity wall of the mold, so that the integration of the film with the base is effected simultaneously with the forming of base. Each contact member is subsequently fitted in an injection-molded void facing the terminal portion, or is secured in place at the same time as the injection molding.

16 Claims, 6 Drawing Sheets

METHOD OF MAKING AN ANTIFOGGING WINDOW PLATE OF SYNTHETIC RESINS

This application is a continuation of application Ser. No. 08/525,103 filed Sep. 8, 1995, now abandoned.

BACKGROUND OF THE INVENTION

1. Field of the Invention

The present invention relates to a window plate made of synthetic resins and adapted for use in the automobile vehicles or the like, and more particularly relates to a window plate made of synthetic resins to have an antifogging property, as well as a method of making the window plate.

2. Prior Art

Many proposals have been made to substitute plastics boards for the classical glass windows, so as to render the automobile bodies lighter in weight. On the other hand, the problem of an atmospheric vapor condensing to fog the windows and to lower the visibility thereof has been reported, whether the windows are made of glass or plastics. Certain plastics window plates of a double-stratified structure consisting of a plastics base and a resin film bonded thereto were developed to resolve this problem. In connection with the plastic window, a pattern of electrically conductive heating wire has been proposed to be previously printed on the resin film.

An example of such proposals is disclosed in the Japanese Unexamined Patent Publication No. Hei. 6-170883, wherein a resin film of a window shape and having the pattern of heating wire printed thereon is inserted in an injection mold. Another resin injected into this mold will form a base integral with the inserted resin film to provide a two-stratified window plate. The printing of the pattern of heating wire can easily be done onto the thin, flat and transparent resin film, and such film will readily be disposed in the mold so as to fit on a curved wall of its cavity. Thus, plastics window plates may be produced efficiently to be of any desired accurate shape and dimension as usual in the injection molding. The method proposed in the Publication No. 6-170883 can produce the window plate of either type shown in FIG. 9A or 9B, depending on whether a front side or a rear side of the resin film 21 is in contact with the cavity wall. In one type 23 of the window plate, the film's side 21a having the printed pattern of heating wire 22 is exposed to the outside. In the other type 25, said side 21a merges with the plastics base 24 and is not exposed.

It is however noted that both the types 23 and 25 are not necessarily an ideal product. In a case wherein the window plate 23 has the heating wire 22 exposed as shown in FIG. 9A, the thickness of the wire amounting to several tens $\mu$m will cause a noticeable undulation in the film 21 due to the pressure and heat of the resin injected to form the plastics base. Such an undulation will not only spoil the appearance but also distort an image seen through this window plate. In another case wherein the window plate 25 has the heating wire 22 not exposed as shown in FIG. 9B, the surface unevenness of resin film 21 will be diminished by the plastic base so that the window plate has smooth major surfaces. However, an electric wiring to the embedded heating wire 22 would not be possible unless certain special after-treatments are done of this window plate.

OBJECTS AND SUMMARY OF THE INVENTION

In order to resolve those drawbacks which the prior art has encountered, a first object of the present invention is to provide a synthetic resin window plate having an antifogging property, having smooth surfaces and an excellent appearance and easier to be electrically connected to power source. A second object is to provide a method of making such a synthetic resin window plate.

To achieve the first object, a window plate comprises a transparent film made of a thermoplastic resin, a base made of the same or a different thermoplastic resin, the transparent film having a side printed with a conductive paste and bonded to the base, the conductive paste being cured to form conductive lines as well as a pair of electrodes such that one ends of said lines are integral with one of the electrodes, with the other ends of said conductive lines being integral with the other electrode, at least one portion of each electrode being exposed to the outside through a void formed in the base so as to provide terminal portions, and electric contact members each fitted in the void and electrically connected to the terminal portion.

To achieve the second object, a method of making a synthetic resin window plate comprises in a first preferable mode the steps of (a) applying a conductive paste onto one of sides of a thermoplastic transparent film and curing said paste thereon to form a plurality of lines as well as a pair of electrodes such that one ends of said lines are integral with one of the electrodes, with the other ends of said lines being integral with the other electrode, (b) then disposing the transparent film in a cavity of an injection mold such that the other side of the transparent film does fully contact and stick to a wall of the cavity of said mold, (c) subsequently injecting a further thermoplastic resin into said cavity so that a base is formed to have voids where portions of the electrodes are exposed to provide terminal portions, such that the transparent film is bonded to the base, and (d) finally taking out of the injection mold the base together with the transparent film bonded thereto, before securing an electric contact member in each void so as to be integral with the terminal portion.

Also to achieve the second object mentioned above, a method of making a synthetic resin window plate comprises in a second preferable mode the steps of (a) applying a conductive paste onto one of sides of a thermoplastic transparent film and curing said paste thereon to form a plurality of lines as well as a pair of electrodes such that one ends of said lines are integral with one of the electrodes, with the other ends of said lines being integral with the other electrode, (b) then disposing the transparent film in a cavity of an injection mold such that the other side of the transparent film does fully contact and stick to a wall of the cavity of said mold, and (c) subsequently holding contacts in contact with terminal portions of the electrodes, before injecting a further thermoplastic resin into said cavity so that a base is formed therein, such that the transparent film and the electric contact members are bonded to the base.

DETAILED DESCRIPTION OF THE INVENTION

Figure 1:
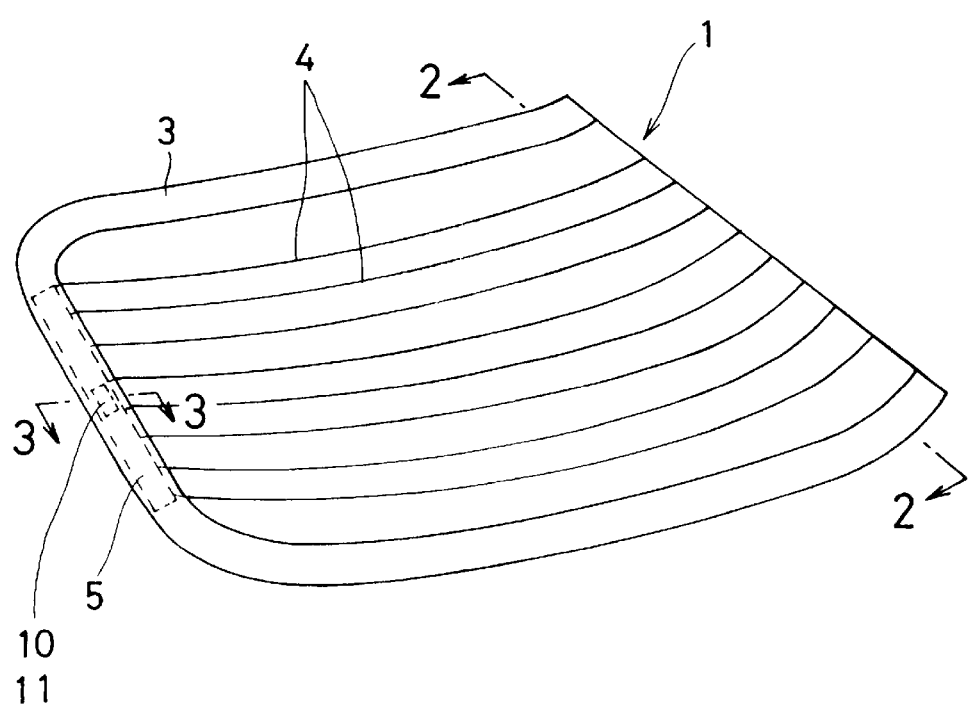
FIG. 1 is a perspective view of an antifogging window plate made of synthetic resins in accordance with the present invention.

A transparent film 2 is used in the method proposed herein to construct a synthetic resin window plate as shown in FIGS. 1–8. It is desired that the film 2 which may be made of any synthetic resin has a softening temperature of 120° C. or higher. This is because a conductive paste printed or otherwise applied to the film must be cured at a moderately high temperature. Preferable examples of the synthetic resin forming the film include polycarbonate resins, polyarylate resins and polysulfone resins. If the transparent film 2 is thinner than 0.1 mm, then a molten plastics compressed and injected into a cavity 7 of a mold to form a base 9 will move the film in part to produce wrinkles or creases therein. If contrarily the film 2 is thicker than 1 mm, then it will not closely fit on the gently curved inner walls of the mold 6 or 6', thus failing to become wholly integral with the base. Therefore, the transparent film 2 is preferably about 0.1–about 1 mm thick, and more preferably about 0.2–about 0.6 mm thick.

The conductive paste may be a kneaded mixture of a conductive metal powder such as silver powder, a binder such as a polyester resin or a polyvinyl acetate resin having a sufficient affinity to the transparent film 2, and a solvent such as butylcellosolve acetate making printable the paste. Some conductive pastes of this type are available on the market. Examples of them comprising silver paste are: 'Dotight FA-323', 'Dotight FA-333' and 'Dotight FA-517' of Fujikura Kasei Co., Ltd.

The pattern of the lines 4 and electrodes 5 applied to the transparent film 2 is not restricted to any special configuration, provided that it generates an enough Joule heat of about 200–800 watts/m² to ensure the antifogging property. Joule heat can be calculated by the following formula (1):

$$W = V^2/R \times 1/S \tag{1}$$

wherein

W=Joule heat (watts/m$^2$),

V=voltage (volts, e.g., 12 volts for passenger cars),

R=resistance (Ω between the electrodes), and

S=Heat-generating area (m$^2$).

Thus, Joule heat of any desired level may be obtained by properly designing the resistance (R) between the electrodes 5. In detail, the thickness, width, length and the number of conductive lines 4 may be determined for this purpose.

However, the applied thickness of the paste for said lines and electrodes is preferably about 8–30 μm. A thickness smaller than 8 μm will be insufficient to ensure the required resistance. A greater thickness than 30 μm will cause the applied paste zones much less flexible than the film 2, to thereby produce cracks in them. The pitch of said conductive lines 4 has to be designed carefully, because a smaller pitch will lower the visibility through window plate, with a greater pitch causing a longer time to clear the fog intermediate the adjacent lines. Generally, the heat conduction coefficient of plastics window plates is merely about one fourth of that of the window glass. Therefore, the pitch which must be made smaller for the plastics plates than for glass plates is preferably from about 10 mm to about 25 mm.

The conductive lines 4 for generating a required amount of Joule heat may not necessarily be straight but be curved, zigzag or the like lines. In case wherein the plastics window is used as the rear windows in passenger cars, the lines 4 will be designed straight not to lower the visibility for car drivers. Typically, straight lines 4 will extend in parallel with each other at a pitch of about 10–about 25 mm and have electrodes 5 formed at their ends as shown in FIG. 1.

Any method may be employed to apply the conductive paste to form the lines 4 and electrodes 5, though the screen printing is recommended because of an easier regulation of their thickness. The curing of the paste applied to the transparent film 2 may be effected batch-wise or continuously by blasting hot air to it, by holding it in an infrared-heating oven or in any other suitable manner.

Figure 3:
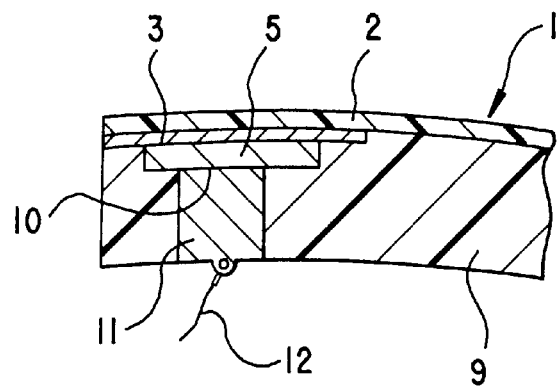
FIG. 3 is a cross-sectional view of the window plate seen from the line 3—3 in FIG. 1.
Figure 8:
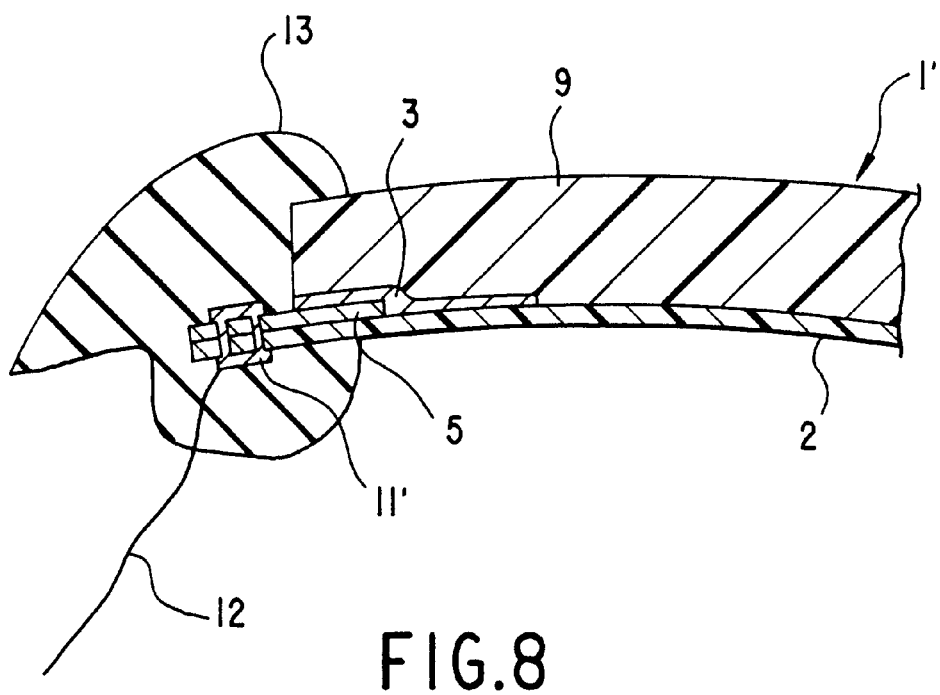
FIG. 8 illustrates a modified example of the antifogging window plate made of synthetic resins, shown in part and in cross section.
Figures 9A, 9B:
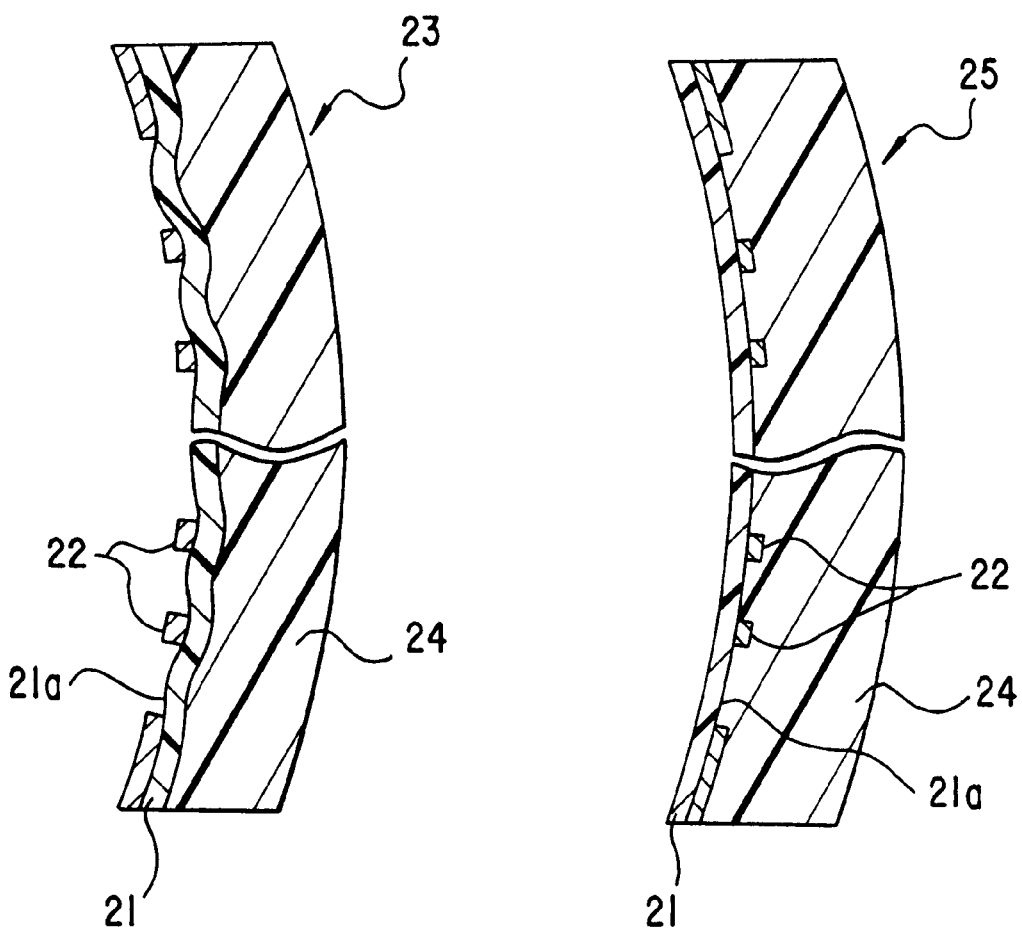
FIG. 9A is a cross section of a prior art synthetic resin window plate that has heating lines exposed to the outside.
FIG. 9B is likewise a cross section of another prior art synthetic resin window plate that has heating lines embedded.

In many cases, the electrodes 5 as well as electric contact members 11 and leads 12 are rendered invisible from the outside, not to impair appearance of the window. Therefore, peripheral zones of the transparent film 2 may be masked (at 3) with an opaque ink, before or after the conductive paste is printed. In a case wherein the transparent film 2 is exposed to the outside as shown in FIG. 3, the mask 3 will be formed at first. In another case wherein the film is located inside as shown in FIG. 8, the conductive paste will be printed at first.

The base 9 of the plastics window may be formed of any transparent and thermoplastic resin. An ordinary, acrylic resin, shock-resistant or heat-resistant acrylic resin, polycarbonate resin, polyarylate resin, polysulfone resin and the like that are self-adhesive to the transparent film 2 when molten are preferable examples. If another resin that are not or scarcely self-adhesive is used, then a proper adhesive agent layer may be interposed between the base 9 and the film 2. An ultraviolet absorbing agent, a coloring agent, an infrared absorbing agent and/or other useful agents can be added to the resin forming the base, in order to improve the performance of the plastics window.

In the method of producing the plastics window summarized above, the transparent film 2 having printed thereon the lines 4 and electrodes 5 will be placed in the injection mold 6 or 6' having the cavity 7 of a configuration defining said window. A molten thermoplastic resin will be injected into the cavity to form the base 9 to which the transparent film 2 is bonded simultaneously, as noted above. Its side 2a not printed with the paste must be held in contact with the cavity's wall 7a so that the conductive lines 4 and electrodes 5 are covered with the base 9. In a manner of holding the printed film 2 in the mold 6 or 6', the film will be trimmed at first to be of a finished shape and dimension. This film will then be set in position electrostatically or by vacuum. Alternatively, some positioning pins may be provided in one of split molds 6 or 6' so as to regulate the untrimmed film 2. The film will be trimmed automatically when the split molds are closed.

The transparent film 2 will be fusion bonded to the base 9 when the resin is injected into the mold's cavity 7 to form said base. It is an important feature that a portion of each electrode 5 is not covered with the injected resin. Such a portion facing an open void of the base will serve as a terminal portion 10 to which an electric contact member 11 is to be connected. Two techniques are selectively employable herein, as will be detailed below, to protect the terminal portions for the contact members 11 from being covered with the resin forming the base.

Figure 6:
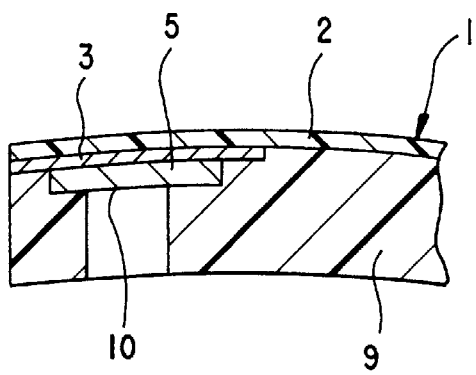
FIG. 6 is a cross section of a portion of the product made in the first preferable mode of the method.

In one preferable mode as defined in the accompanying claims 10 to 14, the molten thermoplastic resin is not supplied to the terminal portions 10 of the electrodes 5 when injection molding is done. The open void is thus formed in the base 9 to which the transparent film 2 is bonded, so as to expose each terminal portion 10 as shown in FIG. 6. The electric contact 11 will be fitted in the void and bonded or otherwise secured to the base 9 of the laminated product taken out of the mold 6. In one way of forming such a void, the mold's cavity 7 will have a lug 8 corresponding to the void. Alternatively, a core of a shape corresponding to the void will be disposed at a position facing the each electrode's terminal portion 10. After taking the injection product out of the mold, the core will be removed.

Figure 7:
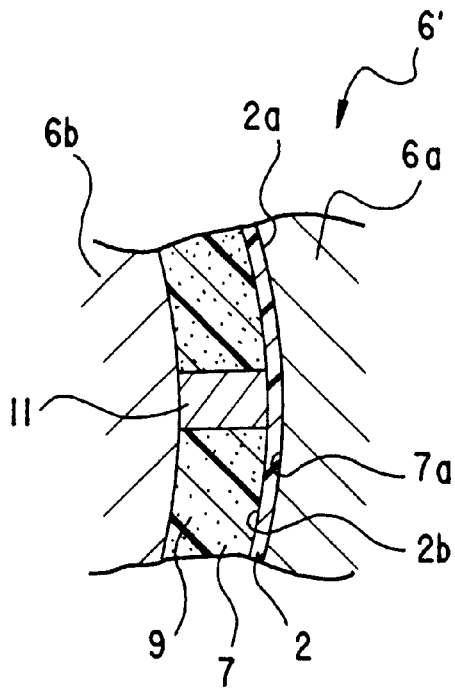
FIG. 7 is a vertical cross section of another injection mold to be used in a second preferable mode of the method of making the synthetic resin window plate.

In another preferable mode as defined in the accompanying claims 15 to 19, the electric contact member 11 will be set in place facing each electrode's terminal portion 11, as shown in FIG. 7. Then, the molten thermoplastic resin will be injected towards the film's side 2b to which the electrodes are printed previously. Since the contact members 11 are attached to the base 9 simultaneously with the injection molding thereof, no additional operation will be needed after the product is taken off the mold.

The terminal portions 10 of the electrodes 5 may be located near and behind the periphery of the window plate 1, as shown for example in FIG. 3. Alternatively, said portions 10 may be located outside said periphery of the window plate 1', as shown in FIG. 8. The contact members 11 as well as the leads 12 will be hidden by the printed mask 3, if the film 2 is exposed to the outside as shown in FIG. 3. However, the printed mask will not be sufficient to render invisible those members 11' and 12, if the base 9 is exposed to the outside of an automobile car as shown in FIG. 8. In this case, an ornamental braid or lace 13 may be formed around the window plate so as to hide them.

Although the ordinary injection molding is employable to form the base 9, the injection-compression molding is more preferable when a large-sized window plate free of any undesired residual strain or deformation has to be produced.

A silicone coat or the like hard coat for improving scratch resistance may be applied to the window plate produced in the manner described above.

In summary, provided herein is the window plate 1 composed of the base 9 and the transparent film 2, and this film made of the thermoplastic synthetic resin has its side 2b having the plurality of printed conductive lines 4 and the pair of printed electrodes 5. One of base's sides bonded to the film's side 2b (having lines 4 capable of generating Joule heat to clear fog) does absorb any surface irregularity which said lines and electrodes 5 would otherwise cause. Both the other side 2a of said film and the other side of said base 9 are smooth. Thus no undulation or the like is present in either surface of the window plate, whereby the window plate is not only improved in its appearance, but also no image seen therethrough will be distorted. The electric contact members 11 are fitted each in the void formed in the base 9 to face the terminal portion 10 of each electrode 5. Those contact members are electrically connected thereto in such a state that the outer face of each contact member is exposed to the outside of the window plate 1. Therefore, no after-treatment is needed when connecting the leads to said electrodes to activate the conductive lines 4.

Such an antifogging window plate made of synthetic resins can be produced herein simply by placing in the mold 6 or 6' the transparent film 2 having the lines 4 and electrodes 5 that are formed of the conductive paste printed to and cured on one side 2b of the film 2. The other side 2a devoid of those lines and electrodes will be held in contact with the wall 7a of the mold's cavity, when the synthetic resin is injected to laminate the base 9 with the film.

In one preferable mode, the synthetic resin injected into the mold's cavity 7 is not supplied to the terminal portions 10 of electrodes 5, so that said portions 10 are exposed through the base 9 to the outside. Thus, the contact members 11 will easily be secured to terminal portions and exposed to the outside of the thus produced window plate 1.

In the other mode, the contact members 11 are held tightly on the electrode's terminal portions 10 of the film 2 placed on the wall 7a of cavity, when the molten resin is injected thereinto. The resin solidifying to form the base 9 laminated with the film will permanently fix the contact members to said base. Thus, the forming of terminal portions and the connecting of contact members thereto are effected simultaneously with the forming of the base, to thereby decrease the number of steps carried out to produce the window plate 1.

THE PREFERRED EMBODIMENTS

Now some embodiments of the present invention will be described referring to the drawings and with respect to the antifogging window plate made of synthetic resins and the method of producing same. In each embodiment, a transparent polycarbonate film 'Polycar-Ace' (trade name, and a product of the Tsutsunaka Plastic Industry Co., Ltd.) 0.5 mm thick was used. A conductive paste used together with the film was 'Dotight FA-333' (trade name, and a product of the Fujikura Kasei Co., Ltd.), whose specific resistance was $3.0 \times 10^5$ Ωcm.

[First Embodiment]

Figure 2:
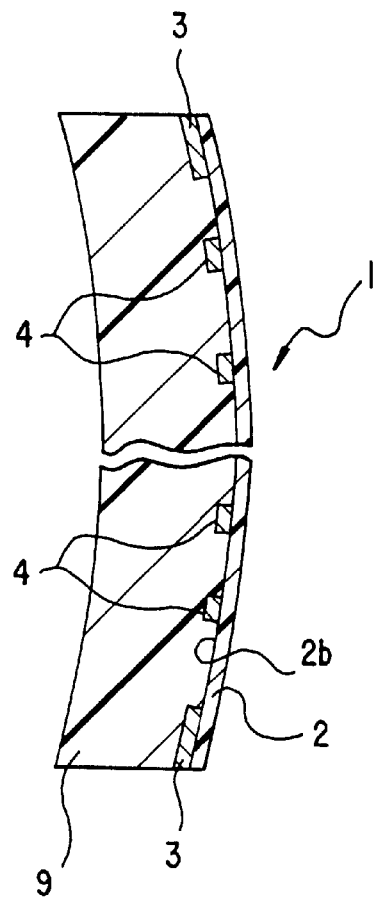
FIG. 2 is a cross-sectional view of the window plate seen from the line 2—2 in FIG. 1.

A plastics window plate 1 as shown in FIGS. 1 to 3 was produced for use as the automobile car's rear window.

This window plate was manufactured in the following manner.

Figure 4:
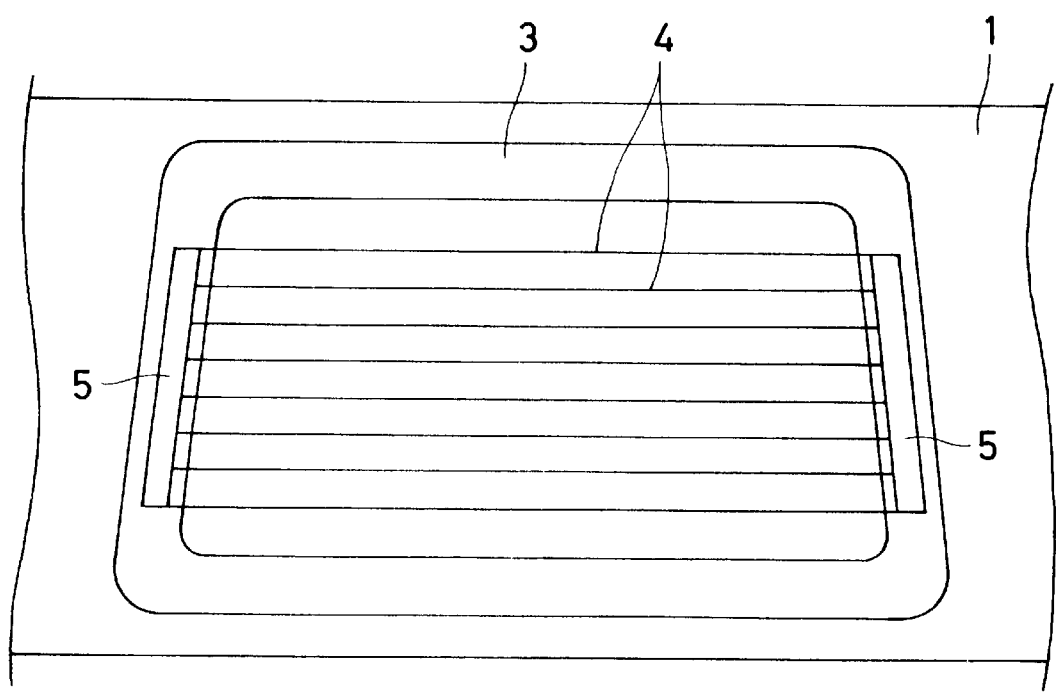
FIG. 4 is a front elevation of a transparent film having a conductive paste applied thereto in a pattern so as to be used as a part of the antifogging synthetic resin window plate which will be produced in accordance of a method provided herein.

At first, a peripheral mask 3 of a width of 40 mm was printed using an opaque ink, to the peripheral zones of the transparent film 2 to define a contour of the rear window, as shown in FIG. 4. Subsequently, the conductive paste was screen-printed on the same side of said film. A plurality of conductive lines 4 thus formed at a pitch of 15 mm were 1.0 mm wide. A pair of electrodes 5 each 20 mm wide were printed on the mask 3 so as to be integral with the right and left ends of those lines 4. Then, the film 2 was heated in a far infrared oven at 120° C. for 30 minutes to cure the printed lines and electrodes. A peripheral edge outside the mask 3 were punched off the film 2 to provide a finished film of a flat shape corresponding to the window plate which was to be produced.

Figure 5:
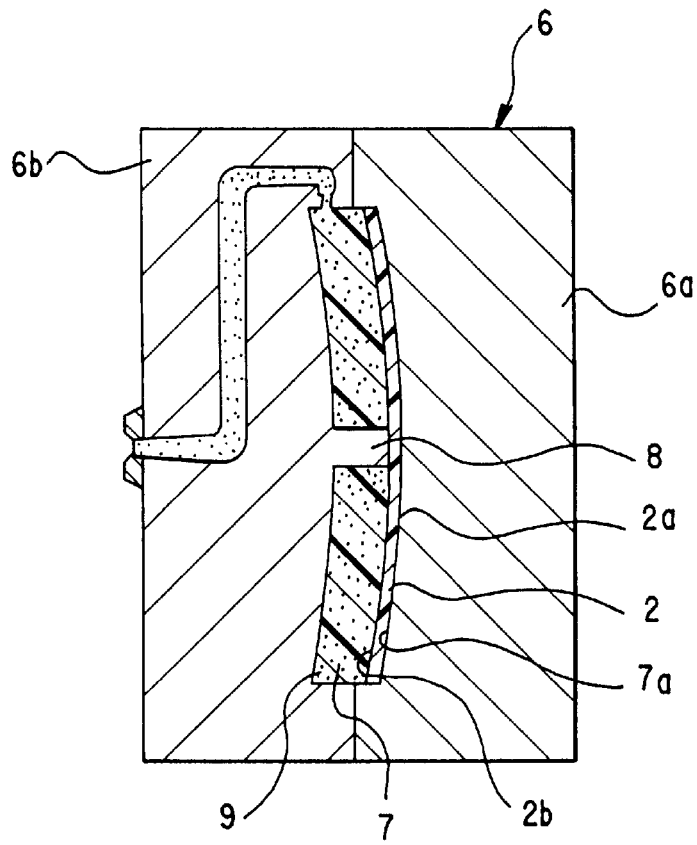
FIG. 5 is a vertical cross section of an injection mold to be used in a first preferable mode of the method of making the synthetic resin window plate.

At the next step shown in FIG. 5, the film 2 was set in a movable head 6a of an injection mold 6. This film's side 2a not printed with the paste was secured by vacuum to a concave wall 7a, before closing same with a fixed head 6b. This wall defined a cavity 7 in the mold when the heads 6a and 6b joined one another. The fixed head 6b had two lugs 8 integral with its portions corresponding to the electrodes 5. Those lugs 8 were of a height such that they contacted terminal portions of said electrodes when the mold 6 was closed, so that no amount of a molten resin was supplied to the terminal portions. A molten resin, which was a polycarbonate resin, was then injected into the mold's cavity 7 to form a base 9 integral with the printed side 2b of the transparent film 2. The thus laminated article, which was subsequently cooled in and taken out of the mold 6, was of a structure as shown in FIGS. 2 and 6. As seen there, the conductive lines 4 were embedded in the base 9, and the laminate was gently convex towards the interior of the automobile car. The terminal portions 10 formed by means of the lugs 8 protruding from the mold 6 were exposed in the base 9 and to the outside. Electric contact members 11 were then fitted in those voids facing the terminal portions and adjoined thereto by means of an electrically conductive adhesive to finish the window plate 1.

This window plate 1 made of synthetic resins had smooth surfaces at both the sides thereof where the base 9 and film 2 were exposed. Therefore, the window plate was not only of an excellent appearance but also free of image distortion.

[Second Embodiment]

In the second embodiment, a window plate 1 of the same shape as that provided in the first embodiment, but installment of electric contact elements 11 was effected simultaneously with injection molding. FIG. 7 shows that the mold 6' used in this case is also of the same shape as that 6 in the first embodiment, except for the lugs 8 protruding into cavity 7 for defining terminal portions 10 on the electrodes 5. Thus, the same reference numerals are allotted to the members or elements in FIG. 7 that are the same as those shown in FIG. 5, and description thereof is abbreviated.

The mask was likewise printed with an opaque ink on the transparent film 2, which was then subjected to the screen-printing of the conductive paste. This film was then placed in the mold 6' and sucked such that its side 2a not printed did stick to the concave wall 7a of said mold. The contact elements 11 were thus held on the electrodes' terminal portions 10, before the mold 6' was closed. A molten polycarbonate was injected into the cavity 7 of this mold so as to form the base, whereby the printed side 2b of the film 2 became integral with this base 9, with each contact element 11 also becoming integral with the corresponding terminal portion 10. The thus laminated article was taken out of the mold 6', after cooled down, as a window plate of the same shape as that which was produced in the first embodiment.

Thus, this window plate 1 also was not only of an excellent appearance but also free of image distortion.

What is claimed is:

1. A method of making a synthetic resin window plate, the method comprising the steps of:
   (a) applying a conductive paste onto one of sides of a thermoplastic transparent film and curing said paste thereon to form a plurality of lines as well as a pair of electrodes such that one ends of said lines are integral with one of the electrodes, with the other ends of said lines being integral with the other electrode;
   (b) then disposing the transparent film in a cavity of an injection mold such that the other side of the transparent film does fully contact and stick to a wall of the cavity of said mold;
   (c) subsequently injecting a further thermoplastic resin into said cavity so that a base is formed to have voids where portions of the electrodes are exposed to provide terminal portions, such that the transparent film is bonded to the base; and
   (d) finally taking out of the injection mold the base together with the transparent film bonded thereto, before securing an electric contact member in each void so as to be integral with the terminal portion.

2. The method as defined in claim 1, wherein the transparent film is about 0.1–about 1 mm thick.

3. The method as defined in claim 1, wherein the conductive lines as well as the electrodes are screenprinted.

4. The method as defined in claim 2, wherein the conductive lines as well as the electrodes are screenprinted.

5. The method as claimed in claim 1, wherein the conductive lines as well as the electrodes are about 8–about 30 $\mu$m thick.

6. A method of making a synthetic resin window plate, the method comprising the steps of:
   (a) applying a conductive paste onto one of sides of a thermoplastic transparent film and curing said paste thereon to form a plurality of lines as well as a pair of electrodes such that one ends of said lines are integral with one of the electrodes, with the other ends of said lines being integral with the other electrode;
   (b) then disposing the transparent film in a cavity of an injection mold such that the other side of the transparent film does fully contact and stick to a wall of the cavity of said mold; and
   (c) subsequently holding contacts in contact with terminal portions of the electrodes, before injecting a further thermoplastic resin into said cavity so that a base is formed therein, such that the transparent film and the electric contact members are bonded to the base.

7. The method as defined in claim 6, wherein the transparent film is about 0.1–about 1 mm thick.

8. The method as defined in claim 6, wherein the conductive lines as well as the electrodes are screen printed.

9. The method as defined in claim 7, wherein the conductive lines as well as the electrodes are screen printed.

10. The method as defined in claim 6, wherein the conductive lines as well as the electrodes are about 8–about 30 $\mu$m thick.

11. The method as defined in claim 2, wherein the conductive lines as well as the electrodes are about 8–about 30 $\mu$m thick.

12. The method as defined in claim 3, wherein the conductive lines as well as the electrodes are about 8–about 30 $\mu$m thick.

13. The method as defined in claim 4, wherein the conductive lines as well as the electrodes are about 8–about 30 $\mu$m thick.

14. The method as defined in claim 7, wherein the conductive lines as well as the electrodes are about 8–about 30 $\mu$m thick.

15. The method as defined in claim 8, wherein the conductive lines as well as the electrodes are about 8–about 30 $\mu$m thick.

16. The method as defined in claim 9, wherein the conductive lines as well as the electrodes are about 8–about 30 $\mu$m thick.

* * * * *